(12) United States Patent
Circe

(10) Patent No.: US 9,922,337 B2
(45) Date of Patent: *Mar. 20, 2018

(54) SYSTEM AND METHOD FOR DYNAMICALLY VALUING SOCIAL MEDIA INFLUENCE IN REMOTE TRANSACTION INITIATION

(71) Applicant: Brett Circe, Fort Lauderdale, FL (US)

(72) Inventor: Brett Circe, Fort Lauderdale, FL (US)

(*) Notice: Subject to any disclaimer, the term of this patent is extended or adjusted under 35 U.S.C. 154(b) by 567 days.

This patent is subject to a terminal disclaimer.

(21) Appl. No.: 14/472,613

(22) Filed: Aug. 29, 2014

(65) Prior Publication Data

US 2014/0372192 A1 Dec. 18, 2014

Related U.S. Application Data

(63) Continuation-in-part of application No. 13/907,869, filed on Jun. 1, 2013, now Pat. No. 9,773,255.

(51) Int. Cl.
*G06Q 30/02* (2012.01)
*G06Q 50/00* (2012.01)

(52) U.S. Cl.
CPC ......... *G06Q 30/0217* (2013.01); *G06Q 30/02* (2013.01); *G06Q 50/01* (2013.01)

(58) Field of Classification Search
CPC ............... G06Q 30/0214; G06Q 50/01; G06Q 30/0207; G06Q 30/0217; G06Q 30/0237
See application file for complete search history.

(56) References Cited

U.S. PATENT DOCUMENTS

| | | | | |
|---|---|---|---|---|
| 5,923,016 A | * | 7/1999 | Fredregill | G06Q 20/342 235/375 |
| 8,626,828 B2 | * | 1/2014 | Lee | G06Q 30/02 705/14.1 |
| 2003/0212595 A1 | * | 11/2003 | Antonucci | G06Q 30/02 705/14.27 |
| 2003/0220834 A1 | * | 11/2003 | Leung | G06O 30/02 705/14.25 |
| 2006/0190281 A1 | * | 8/2006 | Kott | G06Q 30/02 709/226 |
| 2008/0025488 A1 | * | 1/2008 | Dean | H04M 3/42008 379/201.11 |
| 2008/0103968 A1 | * | 5/2008 | Bies | G06Q 20/06 705/39 |
| 2008/0233984 A1 | * | 9/2008 | Franklin | H04L 51/38 455/466 |

(Continued)

*Primary Examiner* — David J Stoltenberg
*Assistant Examiner* — Robert C Johnson
(74) *Attorney, Agent, or Firm* — The Keys Law Firm PLLC

(57) ABSTRACT

A system and method for assigning a value to an electronic communications action by a user based on the social media profile of the user in the initiation of transactions based on some electronic communications action by a user, such as updating their social status with their mobile device. The value of the reward or distribution is variable as it is determined in real time from a calculation using the user's social media influence. The components of Applicant's invention include a system monitor, a validation module, and a redemption module, which work in concert to provide a user with a tangible and immediately usable reward of some value, or credit towards the same, in response to the user publishing or sending certain social status updates, messages, or posts with their mobile device, with the value awarded determined in real time.

20 Claims, 13 Drawing Sheets

(56) References Cited

U.S. PATENT DOCUMENTS

| | | | | |
|---|---|---|---|---|
| 2009/0170608 A1* | 7/2009 | Herrmann | G06Q 30/02 | 463/42 |
| 2009/0171760 A1* | 7/2009 | Aarnio | G06Q 30/02 | 705/14.66 |
| 2009/0182589 A1* | 7/2009 | Kendall | G06Q 10/02 | 705/5 |
| 2010/0062840 A1* | 3/2010 | Herrmann | G07F 17/32 | 463/25 |
| 2010/0160035 A1* | 6/2010 | Herrmann | G07F 17/32 | 463/25 |
| 2010/0262282 A1* | 10/2010 | Segal | G06Q 30/02 | 700/241 |
| 2011/0141974 A1* | 6/2011 | Lieberman | H04L 51/38 | 370/328 |
| 2011/0144801 A1* | 6/2011 | Selker | G06O 30/0251 | 700/231 |
| 2011/0178861 A1* | 7/2011 | Georgi | G06Q 30/02 | 705/14.25 |
| 2011/0184792 A1* | 7/2011 | Butcher | G06Q 10/10 | 705/14.13 |
| 2011/0218846 A1* | 9/2011 | Fieldman | G06Q 30/0214 | 705/14.16 |
| 2011/0247036 A1* | 10/2011 | Adimatyam | H04N 5/44543 | 725/40 |
| 2011/0320250 A1* | 12/2011 | Gemmell | G06Q 30/02 | 705/14.16 |
| 2012/0036085 A1* | 2/2012 | Srivastava | G06Q 10/067 | 705/348 |
| 2012/0047129 A1* | 2/2012 | Redstone | G06F 17/3087 | 707/723 |
| 2012/0054002 A1* | 3/2012 | Rotbard | G06Q 20/20 | 705/14.3 |
| 2012/0089451 A1* | 4/2012 | Agramonte | G06Q 10/10 | 705/14.23 |
| 2012/0265703 A1* | 10/2012 | Basra | G06Q 10/10 | 705/319 |
| 2012/0300087 A1* | 11/2012 | Shore | G06Q 10/10 | 348/207.1 |
| 2013/0031080 A1* | 1/2013 | Vijaywargi | G06F 17/30887 | 707/706 |
| 2013/0054016 A1* | 2/2013 | Canter | G06O 30/0269 | 700/237 |
| 2013/0237300 A1* | 9/2013 | Johnson | G07F 17/3255 | 463/13 |
| 2014/0156369 A1* | 6/2014 | Circe | G06O 30/0217 | 705/14.19 |

* cited by examiner

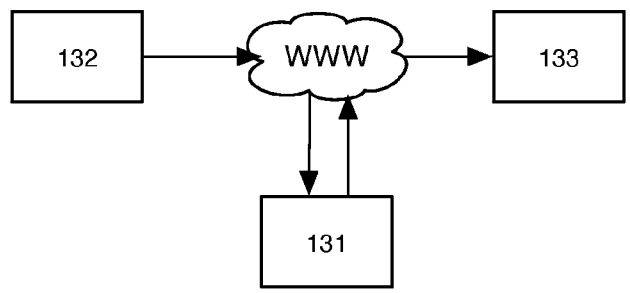
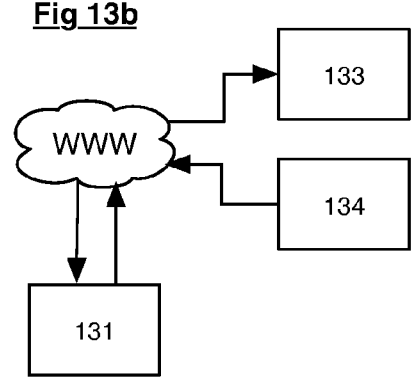
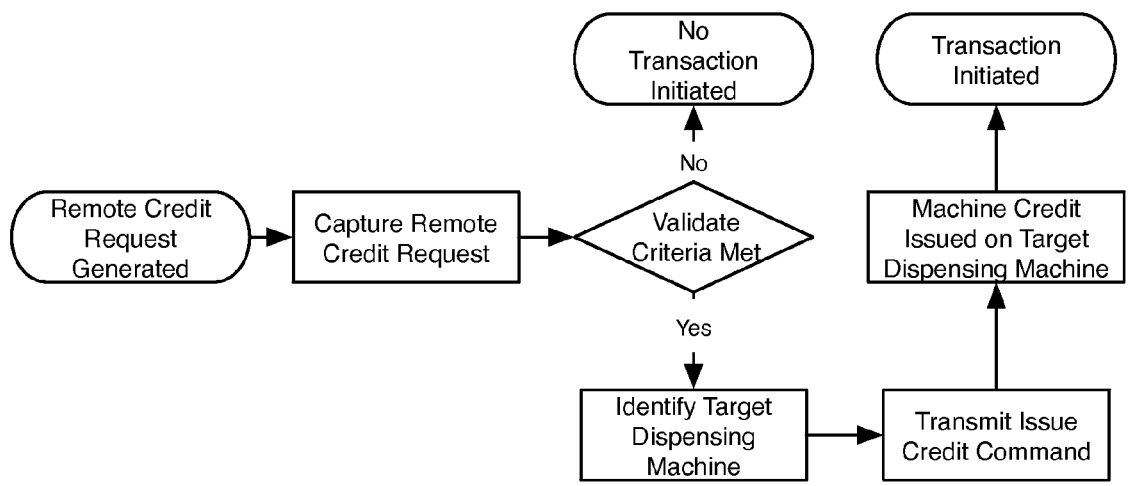

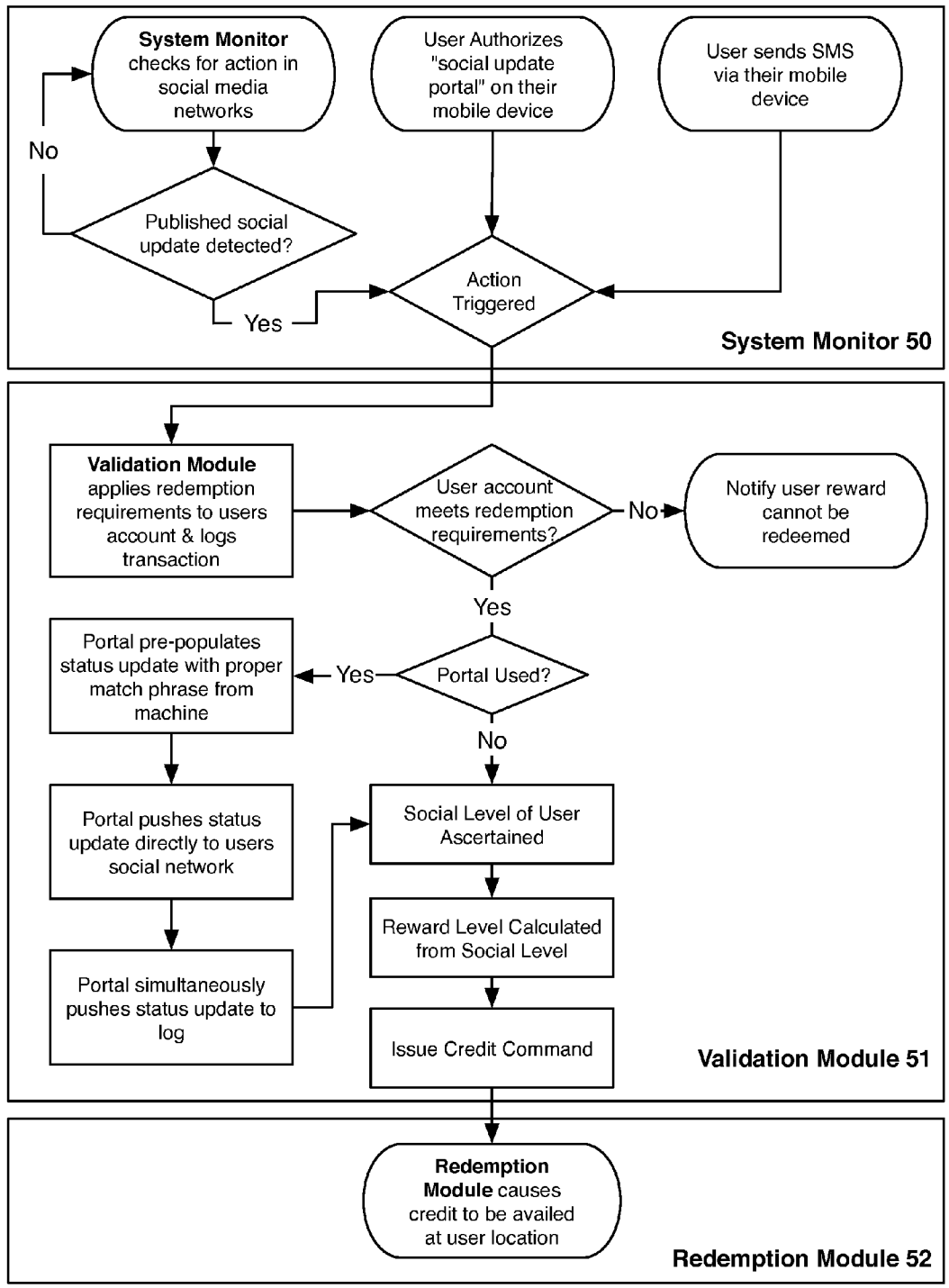

SYSTEM AND METHOD FOR DYNAMICALLY VALUING SOCIAL MEDIA INFLUENCE IN REMOTE TRANSACTION INITIATION

CROSS REFERENCE TO RELATED APPLICATIONS

This application is a continuation in part, and claims the benefit of co-pending U.S. patent application Ser. No. 13/907,869 filed Jun. 1, 2013, which claimed the benefit of U.S. provisional patent application Ser. No. 61/659,608 filed Jun. 14, 2012.

BACKGROUND OF THE INVENTION

Field of the Invention

This invention relates to a remote transaction system and, more particularly, to a system and method which facilitates mobile commerce and dynamically values remote user actions based on a particular user's social media profile.

Description of the Prior Art

Rewards in the online world for social interactions and updates are becoming very popular. Perks, points, credits, stickers and badges are just a few of the virtual rewards users acquire on a daily basis by interacting with their social networks. U.S. Patent Application No. 2010/0076831, issued to Samuel, teaches the provision of awards to a user's account in response to a user accessing access to one of the plurality of web pages. U.S. Patent Application No. 2011/0028160, issued to Roeding, et al., discloses detecting a presence of a mobile phone within an enclosed space and subsequently transmitting advertising or rewards information to the mobile phone based on its presence. U.S. Patent Application No. 2011/0275311, issued to Buehler, et al., discloses a method of awarding incentives to a user in response to the user participating electronically in ancillary activities relating to a media program currently being broadcast. U.S. Patent Application No. 2012/0066041, issued to Mankoff, discloses methods and systems for offering a real and valuable gift, to be delivered virtually, to users.

Such existing systems and methods for providing rewards to consumers for promoted activities are limited. Such systems and methods often work to provide users with rewards to a user account which are virtual or must be subsequently redeemed. In other scenarios, a user may be required to generate rewards in such existing systems and methods by availing himself to some merchant related device or software. Another common limitation is that rewards in such existing systems and methods are not normally physical and/or tangible and designed to be consumable immediately at the location where the user is situated.

Moreover, systems and methods for initiating transactions on vending machines, gaming machines, or the like (collectively, credit accepting machines or dispensing machines), are conventionally limited in that they include the issuance of machine credits and the subsequent redemption of machine credits for something of value by a user or administrator of the dispensing machine who is present at the dispensing machine and interacting therewith. Indeed, machine credits on dispensing machines are conventionally issued while a user is in front of the subject dispensing machine, typically in exchange for the entry of payment in the form of coins, cash, or credit cards (or through a near field communication protocol). These machine credits can then be redeemed at the machine for one or more of the items of value which are offered by the machine.

Through recent design changes, some newer systems allow for addition user interaction, such as the provision of a code which can be entered to access a free vend. It is noted, however, there is presently no inherent reason that the initiation of transactions on a vending machine and the issuance of machine credits must be limited to users who are physically in front of and presently interfacing with the subject dispensing machine. While operators of dispensing machines can currently send cash refunds remotely for problems reported and subsequently verified on the machine, there is no method for a support call to be placed and the problem resolved immediately for the end user. If machine credit could be issued in response to the actions of a user (or operator) which were performed remotely, transactions could be initiated in response to a plurality of types of user actions, including actions performed on the Internet or actions performed on a nearby dispensing machine. Therefore, there remains a need for a system and method which can enable a user or administrator of a dispensing machine to issue machine credit in response to user action which is performed remotely relative to the machine issuing the credit. It would be desirable for such a system and method to be configured for a user to be able to receive a physical or tangible reward or initiate a transaction in the real world or in response to the user performing certain requested or directed actions in a social media setting with their mobile device. It would be advantageous for such a system and method to be able to assign a value in rewarding the user's performance of the requested or directed actions in a social media setting based on the user's status in the social media setting.

SUMMARY OF THE INVENTION

A system and method for assigning a value to an electronic communications action by a user based on the social media profile of the user in the initiation of transactions based on some electronic communications action by a user, such as updating their social status with their mobile device. The value of the reward or distribution is variable as it is determined in real time from a calculation using the user's social media influence (also referred to as "social influence" or "social level"). The components of Applicant's invention include a system monitor, a validation module, and a redemption module, which work in concert to provide a user with a tangible and immediately usable reward of some value, or credit towards the same, in response to the user publishing or sending certain social status updates, messages, or posts with their mobile device with the value awarded determined in real time.

As a prerequisite to the operation of a rewards distribution system built in accordance with the present invention, a merchant or other entity seeking to offer tangible or physical rewards through a credit accepting machine must designate one or more credit (or payment) accepting machines to be equipped to automatically (1) apply payment or (2) issue a credit which can be redeemed for products offered by the credit accepting machine. The credit accepting machine must be equipped to do so in response to remotely generated commands to enable it to issues credit exchange for social media activity. In addition, the merchant must designate one or more social actions which a user seeking to redeem a reward can perform through social media in order to redeem such a reward. Typically, the offer of a reward is in exchange for a particular social media action, such as the publication of message containing a triggering match phrase(s) or an electronic endorsement by an end user while the end user is on or near the dispensing machine through which the reward will be availed. It is appreciated, however, that a social media action can be tied to the transmission of an electronic message containing a match phrase over any electronic communication network and that the user is not always required to be at the machine to cause a credit to be issued. A user wishing to redeem a reward can then go to the dispensing machine and follow the instructions for redeeming the reward (i.e. send a social media update containing or consisting of the match phrase "brettmovietheatre") and receive the promised reward from the dispensing machine for free or at a discounted cost.

The system monitor continually monitors social media networks for social updates containing whatever match phrases are being utilized at the given moment. It is expected that a plurality of merchants will be using the system at one time and the system monitor can accommodate any number of merchants and match phrases so long as the match phrases in use at any given time are distinct from one another.

When an active match phrase is identified, the location and other preset criteria pertaining to the device transmitting the update containing the match phrase is validated electronically by the validation module. In the preferred embodiment of the present invention, the social media action performed, such as the match phrase, is additionally valued by the validation module. To be valued, the preset criteria pertaining to the device or user performing the social media action is required to include or otherwise avail information concerning a user's social media influence. The user's social media influence be defined as the number of friends the user has on Facebook®, the number of followers or Twitter®, or a score calculation which incorporates a plurality of factors (such as third party measurement like Klout® and PeerIndex™). In an embodiment where social media actions are have a predetermined, static value and are thus not valued in real time, the validation module terminates after the social media action has been validated.

Once the device has been validated and, if the reward amount is valued, the reward valued, the redemption module, which is attached or otherwise configured to operate the dispensing machine, is electronically commanded to issue a credit for a tangible reward to the user of the device which transmitted the social update, or otherwise provide a credit in an amount corresponding to an assigned value to be used to purchase an item from the dispensing machine. Thus, the user posting the social update on his mobile device while standing in front of the dispensing machine can receive his promised tangible and instantly usable reward in full, or at least a credit towards it, almost immediately after the user published or sent the social status updates, messages, or posts with the match phrase from his mobile device.

The system and method for automatically distributing physical rewards based on some electronic communications action by a user, as summarized above, is an embodiment of, and inherently employs an implementation of Applicant's system and method for remote transaction issuance. The system and method for remote transaction issuance comprises the steps of receiving a remote credit request, validating and possibly valuing the remote credit request (depending on the nature of the remote credit request), and issuing the remote credit.

It is contemplated that in one embodiment, the remote credit requests will be generated from a mobile device, through a mobile software application or mobile web based application, with a user performing a social action or initiating a mobile commerce purchase and transacting the purchase for a designated target dispensing machine or designated type of dispensing machine with geographic parameters. When the remote credit request is embodied as a social media update or other action, the remote credit request may also have a value which relates to the user's social influence calculated and assigned thereto. In another embodiment, the remote credit requests will be generated from an initiating dispensing machine, which is configured to automatically request machine credit on a second, distinct dispensing machine in response to the redemption of one or more particular items at the initiating dispensing machine.

The remote credit request is picked up by a system monitor and routed through a validation module. At the validation module, the remote credit request is validated by confirming the remote credit request satisfies applicable criteria and determining the appropriate target dispensing machine. Once the remote credit request is validated, if it is from a social media update, it may be valued by the validation module based on a user's social media influence (otherwise, all remote credit requests would have a present designated value). From the validation module, a validated (and possibly valued) remote credit request is communicated to a redemption module as a issue credit command, which causes the issuance of machine credit on a target dispensing machine.

It is an object of this invention to provide a system which can provide a user with a physical reward in the real world in response to the user performing certain requested or directed actions in a social media setting with their mobile device.

It is another object of this invention to provide a system and method which can identify preset match phrases in social updates posted in social media outlets, validate the social update and cause a tangible reward to be issued from a dispensing machine in real time.

It is yet another object of this invention to provide a system and method which can provide a user with a physical or tangible reward in the real world in response to the user performing certain requested or directed actions in a social media setting with their mobile device.

It is still another object of this invention to provide a system and method which can assign a value to a user performing certain requested or directed actions in a social media setting with their mobile device base based on the user's social media influence.

These and other objects will be apparent to one of skill in the art.

BRIEF DESCRIPTION OF THE DRAWINGS

FIG. 13a is a block diagram of the operative components of a one dispensing machine embodiment of the system and method for remote transaction initiation in accordance with the present invention.

FIG. 13b is a block diagram of the operative components of a two dispensing machine embodiment of the system and method for remote transaction initiation in accordance with the present invention FIG. 14 is a flow chart of the steps of the remote transaction initiation method in accordance with the present invention.

FIG. 17 shows a flow chart of the operational process through which a social action is rewarded with valuation by the rewards distribution system built in accordance with the present invention.

DETAILED DESCRIPTION OF THE INVENTION

Figure 1:
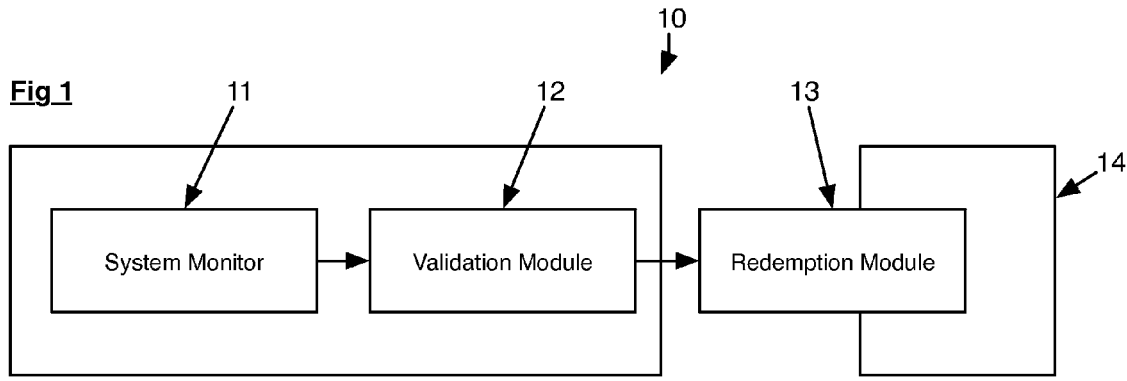
FIG. 1 is block diagram showing the component elements of a rewards distribution system built in accordance with the present invention.

Referring now to the drawings, and in particular FIG. 1, the three primary components utilized by a rewards distribution system 10 and its operational method are shown aligned in their typical operational progression. Specifically, the rewards distribution system 10 includes a system monitor 11, a validation module 12, and a redemption module 13 which each work in concert to allow the distribution of tangible rewards in response to certain preset electronic social interactions. Such tangible rewards are typically dispensed by a conventional electronic dispensing machine 14 on which the redemption module 13 has been configured to run.

Conceptually, the rewards distribution system 10 begins with its system monitor 11 identifying when a user has performed a designated social update via their mobile device. A designated social update is a social update performed by a user which contains a match phrase relevant to an ongoing rewards promotion. The relevant match phrases are typically displayed at the remote location where the user is situated and associated with a particular dispensing machine 14 which dispenses items of value or provides access to admission restricted areas. For example, the dispensing machine 14 could be a vending machine, a video or other game machine, a turnstile, an event ticket dispensing machine, or any like machine. The remote location is typically the facility of a merchant that wishes to offer real world rewards to its patrons and visitors in exchange for said patrons promoting in their social media circles something the merchant wants promoted.

The designated social update containing a relevant match phrase can be performed via a mobi web, an app, or SMS message. Typically, the designated social update is designed to promote the merchant where the dispensing machine 14 is located generally, or to promote some product or service from which the merchant may benefit. It is also contemplated, however, that the designated social update can be designed to promote or advertise some product or service with only an indirect association with the merchant.

Once a relevant match phrase has been identified by the rewards distribution system 10, the rewards distribution system 10 must then validate the designated social update and the sending device through its validation module 12. The validation includes identifying the user's location based on location information electronically embedded in the identified designated social update and confirming that the device has not previously redeemed said reward within any applicable period of time (such as within the past 24 hours). Once verified and validated, the rewards distribution system 10, through its redemption module 13, notifies the appropriate dispensing machine 14 and causes it to issue the reward. As a result, said dispensing machine 14 automatically rewards the user with its relevant real-world reward.

Figure 2:
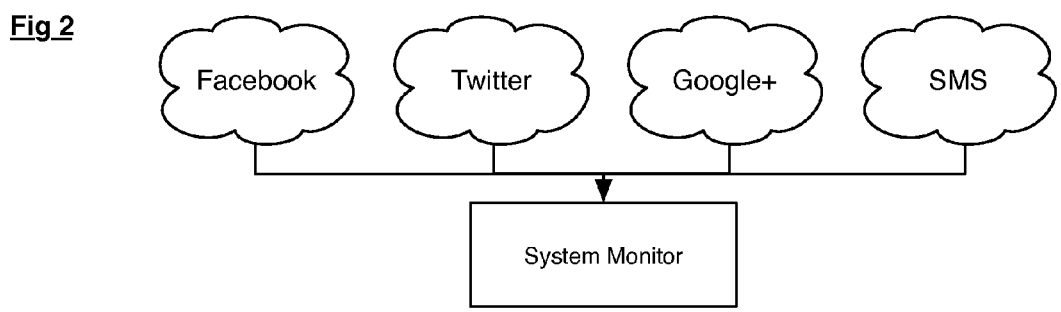
FIG. 2 is block diagram showing a system monitor built in accordance with the present invention.

Referring now to FIG. 2, the system monitor connects to the Internet and through its Internet connection, monitors a plurality of social media outlets. In the preferred embodiment, the system monitor function provides for passive monitoring of electronic communication portals (such as Facebook® pages, Twitter® feeds, Google Plus® accounts, and Common Short Code machines) for social actions such as posts containing a relevant match phrase. In the preferred embodiment, the system monitor function also provides for receipt of redemption notifications from social update portals, which are typically embodied as mobile software applications or interactive webpages, and that are used to simultaneously perform social actions and notify the system monitor. The system monitor function may be embodied in one or more system monitors that can note anytime a social action is detected so that it can pass the relevant information concerning the device which performed the social action to the validation module. It is contemplated that any medium which allows its users to share or publish information or endorse products, services or entities in a social media setting would be suitable for the instant rewards distribution system.

In action, the system monitor is configured to operate based on electronic social actions. As such it will monitor designated Facebook® pages, such as a merchant page who is utilizing a dispensing machine to automatically dispense physical rewards in accordance with the present invention. For example, a movie theatre offering a free movie ticket to any patron who, while at the movie theatre, "Likes" (as an electronic endorsement) the movie theatre's Facebook® page (if the patron had not previously done so) and posts the title of a currently showing movie on the Facebook® page of the movie theatre. Such an action would promote the movie theatre because all of the "Friends" of the patron would see the patron was at that movie theatre to see a movie. To be participating in the rewards distribution system 10 built in accordance with the present invention, the movie theatre would have had to previously register with the rewards distribution system 10, provide access to its Facebook® page to the system monitor, and designate its desired match phrase(s). In the case of the title of a currently showing movie, the movie theatre would for a given week, designate its match phrases as the names of the movies being shown that week.

In a similar fashion, Twitter® feeds and Google Plus® accounts can be monitored for detecting social actions such as match phrases in metadata tags such as hashtags. Instagram® accounts can be monitored for detecting social actions such as specific images. In SMS messages, the system monitor monitors a CSC number, which is displayed along with the match phrase for SMS messages arriving with an acceptable match phrase.

In addition, a social update portal, typically embodied as mobile software application or interactive mobile webpage, can be provided by an administrator to be utilized by users for performing social actions on a social media outlet. A social update portal differs in its interaction with the system monitor in that it is not monitored by the system monitor, but instead sends an electronic notification of a social action to the system monitor whenever the social action is performed through the social update portal. For example, a social update portal configured to access a Facebook® account would notify the system monitor directly upon the performance of a social action, subsequently allowing the redemption of the relevant credit.

Figure 3:
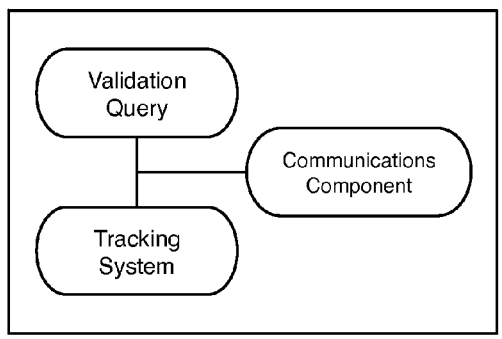
FIG. 3 is block diagram showing an embodiment of a validation module built in accordance with the present invention lacking a valuation component.

Referring now to FIG. 3, the validation module utilizes a plurality of components to perform a validation routine on the devices whose relevant information is passed to it from the system monitor as having published or sent a message containing the match phrase. In this way, the user or patron transmitting the match phrase and seeking to redeem a reward is identified by the mobile device the patron is using. A validation query component performs the validation routine, which can be customized based on the promotion and the participating merchant's criteria. For example, a movie theatre merchant utilizing the rewards distribution system may allow a patron to redeem a free movie ticket once per thirty days while a restaurant may allow a patron to redeem a free soft drink once every seven days. In the preferred embodiment, the validation routine confirms at least the device's proximity to the dispensing machine and the last occasion on which the device redeemed the reward sought. In an alternate embodiment, the validation routine does not check the device's location. In another embodiment, the validation routine is configured to check the user's social influence and require such social influence to be above or below a certain threshold to quality for the reward.

If the user validation established for the match phrase passes, the rewards distribution system 10 will issue a Dispense Reward command. A communication component allows this Dispense Reward command to be transmitted to the redemption module, which in the preferred embodiment is connected to or embedded in the dispensing machine, and also, in the case of a user not qualifying for the reward sought, to notify the user in the same medium that the social update was delivered. A user would not qualify for the reward sought if the validation routine was unable to affirmatively validate the requisite criteria.

A tracking system logs the social status update with the user information, location information, date/time information, social influence information, and other desirable information. This information is kept for reporting and analytic purposes.

Figure 4:
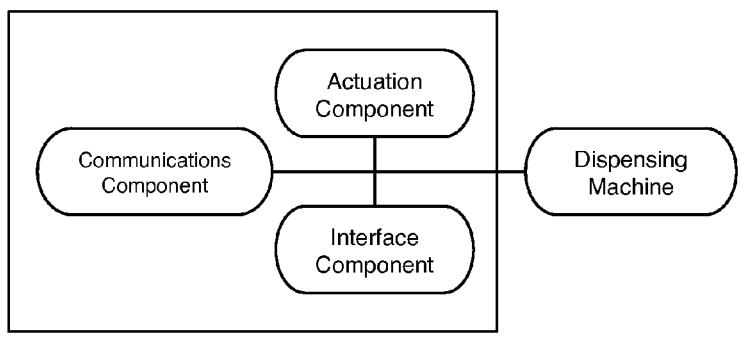
FIG. 4 is block diagram showing a distribution module built in accordance with the present invention.

Referring now to FIG. 4, the communications component of the redemption module receives the Dispense Reward command from the validation module. In the preferred embodiment, the communication component receives transmissions from the validation module via the Internet or cellular service. Once such command is received, the actuation component of the redemption module interprets the command from the validation module and performs additional tasks, such as local validation of pending credits and usage reporting. The interface component is unique to each type of dispensing machine sought to be control. The interface component connects to the machine and causes it to issue the machine credit allowing the user to "redeem" their reward.

Figure 5:
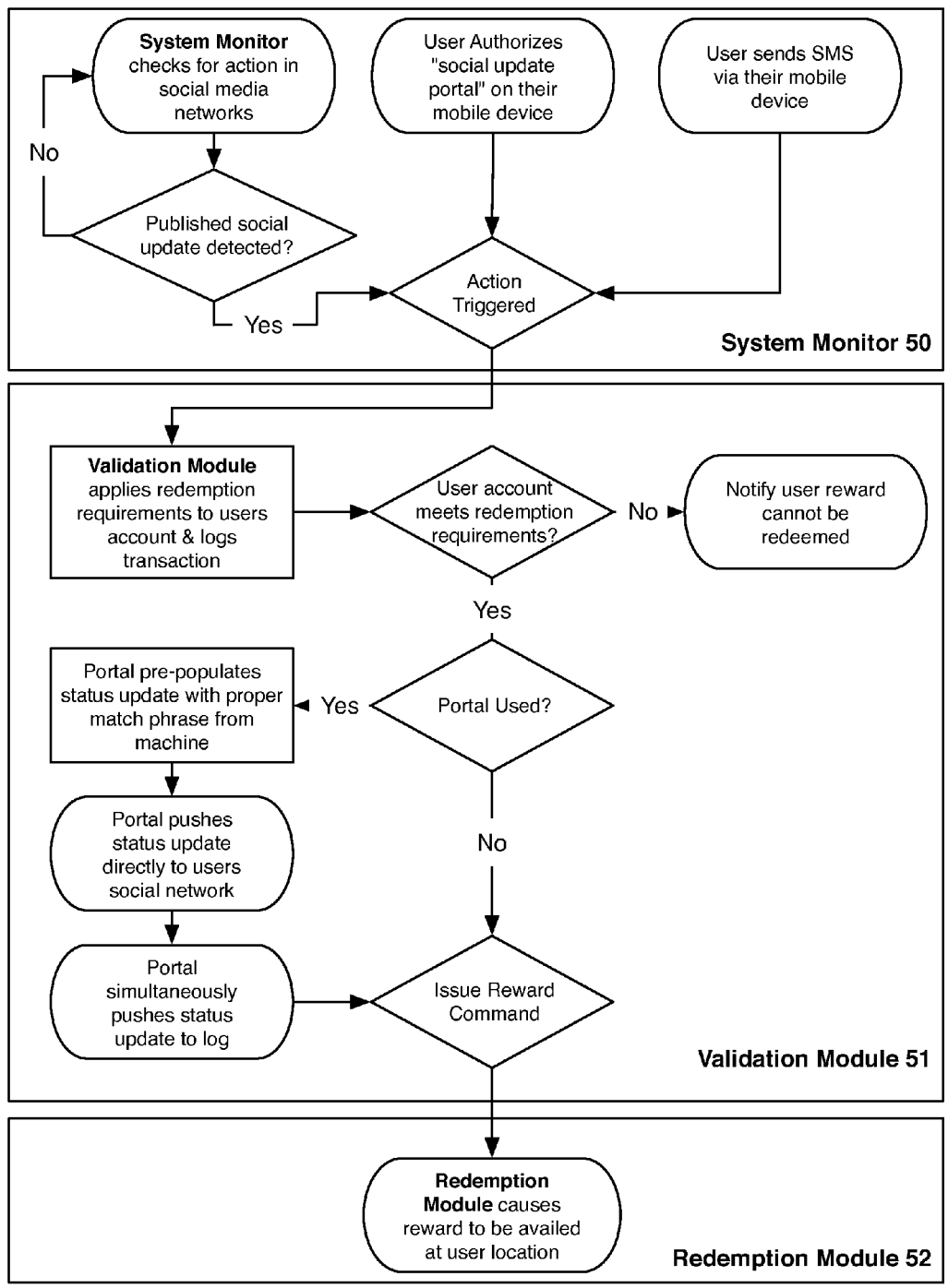
FIG. 5 shows a flow chart of the operational process through which a social action is rewarded without valuation by the rewards distribution system built in accordance with the present invention.
Figure 6:
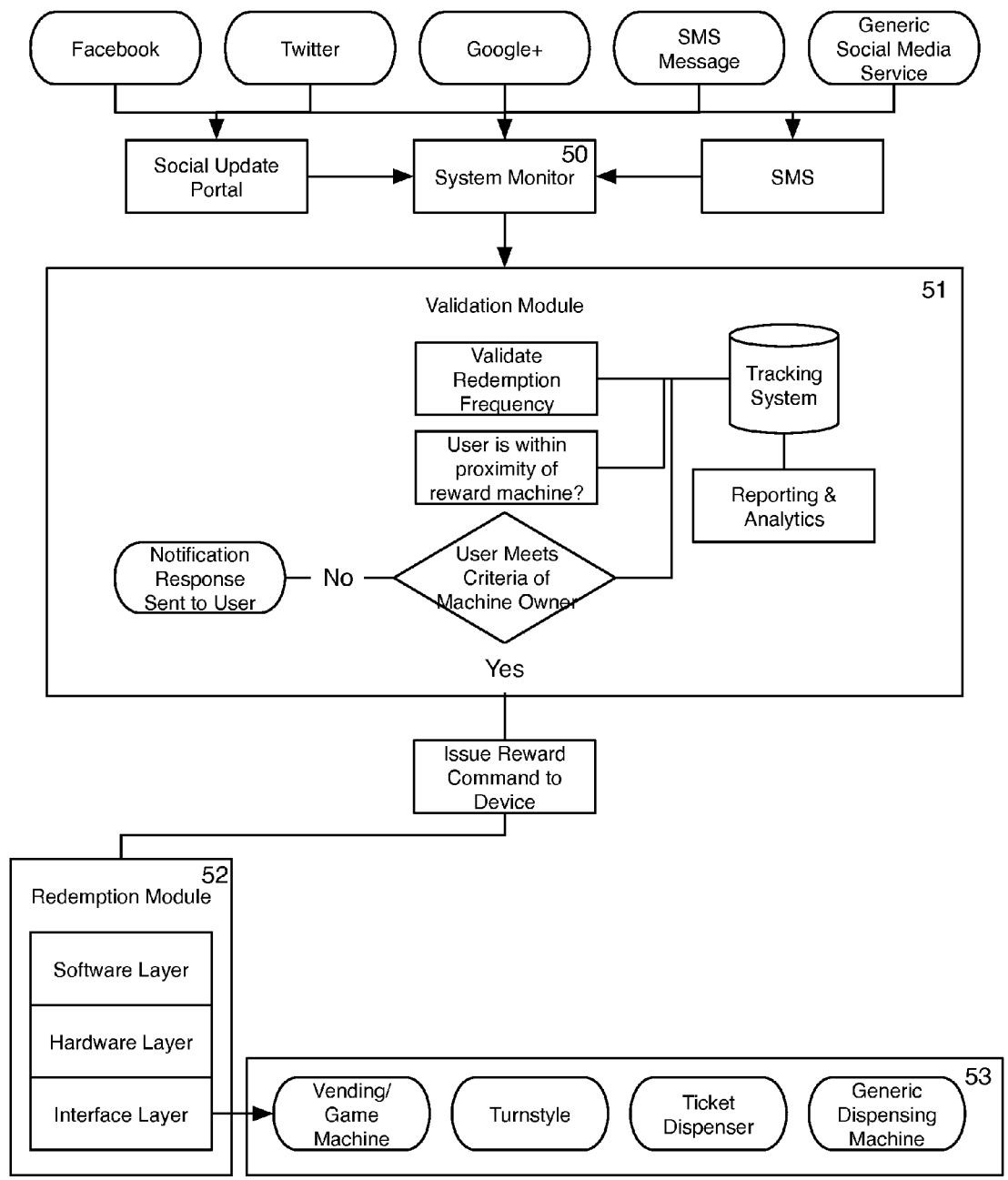
FIG. 6 is a block diagram showing the operational components of the rewards distribution system without valuation built in accordance with the present invention lacking a valuation component.

Referring now to FIGS. 5 and 6, while the rewards distribution system is operational, the system monitor 50 is configured to continually monitor the relevant social media networks for socials actions such as posts or messages which contain a match phrase and otherwise stay apprised of such social actions through social update portals. It is contemplated that such social actions are typically performed through services such as Facebook®, Twitter®, Google+, and standard direct message delivery services. It is therefore understood that the one or more social update portals may be present on user devices through which social media services can be accessed and social actions can be performed and rewarded. The process of providing tangible rewards to an end user in exchange for a particular social action typically starts with an end user seeing a sign associated with a dispensing machine 53 indicating that the dispensing machine 53 will give the user a credit for a tangible or physical reward if they perform a particular social action via their mobile device. The social action may include an update to their social status with a particular match phrase or a status update containing specific language. Typically, such a sign must be located at the machine in advance by the merchant seeking to participate (or other entity participating) in the rewards distribution system that provides tangible rewards for social media activity. It is appreciated that such a sign may be embodied as an electronic sign which allows for match phrase or reward not only be displayed, but also customized in real time. The required social actions being actively used at any given time by the rewards distribution system are kept on file by the system monitor 50 in a rewards database so that the monitor can scan social media networks and/or receive notifications from social update portals and successfully identify qualifying updates with precision. It is contemplated that when a custom match phrases on an electronic sign is used, the system monitor 50 is updated simultaneously with the sign to maintain the integrity of the reward distribution system.

When a user sees sign promoting a reward built in accordance with the present invention and decides to seek the offered reward, the user must utilize their mobile device to follow instructions on the sign to perform a social action that will qualify them for the reward. In the preferred embodiment, the social action would be performed through an SMS message sent to a designated number, the publishing of a social update containing a match phrase, or the authorization of a social update through a social update portal.

It is contemplated that the majority of mobile devices in operation allow for course and/or fine location pinpointing while in use for the applicable social network being used. As such, in the preferred embodiment, some rewards may require the user to enable such location pinpointing on their mobile device and permit it to be shared with and subsequently by the social media outlet or social update portal being used. In such a circumstance, if the user posts a tweet to a Twitter® account in while seeking to redeem an award offered in accordance with the present invention, the user's mobile device must have some form of location tracking enabled and also must allow whatever app being used to access the Twitter® account to share this location information with the tweet. In this embodiment, it is understood that the social update portal would also provide location information in its notifications to the system monitor 50.

As the system monitor 50 is continually monitoring social media networks for social actions that qualify for a reward distribution (such as a social update that includes match phrases that are an exact match to a match phrase in its rewards database) and is configured to receive notifications from social update portals of qualifying social actions, it is able to detect substantially in real time when a qualifying social action is performed. For example, a published social update containing a designated match phrase will be recognized almost immediately once it is posted or sent. Similarly, as any social update portal being utilized is configured to notify the system monitor 50 of qualifying social actions, the system monitor 50 will be apprised of any such action. Once the system monitor 50 detects a social action, the validation module 51 applies a validation routine to the mobile device (typically tracked as a user account by rewards distribution system 10) of the end user. The validation routine primarily determines whether the user account is eligible for a reward distribution by applying any preset redemption criteria to the user account. The preset redemption criteria may include a checking the user account's previous validation redemptions and confirming the previous redemptions do not exceed a preset redemption frequency limit (such as a one redemption per day limit), checking the location of the user account (based on the location of the host mobile device) and confirming the user account is within a preset proximity of a dispensing machine, and any other criteria which may be provided by the user and required by the merchant operating the dispensing machine. Such information may include the age of the user, available demographic information, and social influence information. All information that is acquired and processed by the validation module 51 during this redemption routine is tracked by a unique identifier (such as a telephone number for a mobile device or user account identification) and stored in a database for future reporting and analytics use.

In an alternate embodiment, if the location information from the social network is not available or not required by the merchant operating the dispensing machine, the validation routine may omit or waive this requirement. In either embodiment, the validation module 51 can add additional information about the mobile device (or user's social account) which may have been previously stored by its tracking system and utilize it if the merchant operating the dispensing machine's redemption criteria requires such information as part of the validation routine.

The validation module 51 runs the user validation routine primarily based on the acquired information concerning the user account and mobile device. If the mobile device does not meet the base criteria, which in the preferred embodiment may include a specified proximity to dispensing machine 53 for certain rewards and a preset time duration since the last redemption by the mobile device, a notification is sent to the mobile device that a reward cannot be redeemed. As previously mentioned, additional criteria can be coded into the validation routine at the request of the merchant operating the particular dispensing machine.

If the mobile device meets the criteria for the dispensing machine 53 sought to be used, the validation routine completes successfully and the validation module 51 proceeds to the next step. In many cases, this next step is the transmission of an issue reward command to the redemption module 52. This issue reward command causes the particular dispensing machine 53 to be availed to the user of the mobile device which was just validated by the validation module 51. The redemption module 52 is typically embodied as an interface component located at the site of the dispensing machine 53 so as to allow for the interpretation of commands from the validation module, perform local preset validation steps, and data tracking to enable usage reporting. In addition to the electronic interface with the dispensing machine 53, the redemption module 52 requires network access sufficient to communicate electronically with the validation module (typically an Internet connection) and a form of electrical power.

But as there are different manners in which a social action can be performed, the rewards distribution system 10 is configured to recognize and reward social actions in a plurality of ways. For social actions performed through the publication of a match phrase (typically contained in a published electronic message, the rewards distribution system 10 simply picks up the match phrase through its ongoing scanning of social media outlets by such publication and directs the publishing user account directly to the validation module. For social actions performed through a direct message delivery service (such as SMS or MMS), upon receipt of the message the rewards distribution system 10 is configured log the user account identifying information with the system monitor 50 and then send this information to the validation module 51. For social actions performed through a social update portal, the social update portal is typically first run on the user's mobile device, associated with a particular user account, and authorized to operate on the mobile device. When a user seeks to redeem a reward, the social update portal first communicates electronically with the validation module 51 through the system monitor 50 to check for applicable redemption requirements for the subject requested social action (typically ascertainable while at the dispensing machine), such as those relating to the social media outlet account, existence or frequency of prior redemptions, and possibly location information. If the user's device meets the redemption requirements, instead of the validation module 51 issuing an issue reward command directly, social update portal first loads and populates a status update which will qualify the user for a reward at a particular dispensing machine. This pre-populated status update is then published directly on the user's social media account (such as a Facebook® timeline) and simultaneously confirmed by the validation module 51 through the system monitor 50. Once confirmed, the issue reward command is given as discussed above.

From the patron or user's perspective, the operation of the rewards distribution system 10 built in accordance with the present invention is very straightforward. For example, a user going to a movie may see a sign offering a free ticket in exchange for a social status update which indicates the movie theatre's name and the movie the user is going to watch. In response, the user makes social update via their mobile device which promotes the theatre while standing at a ticket dispensing machine configured to work with the instant rewards distribution system. Shortly thereafter, the ticket dispensing machine at the theatre prints out a ticket for the user. The user has received a tangible, location specific reward in exchange for his social update and the movie theatre has just received a "word of mouth" like promotion.

Likewise, a user at the mall may see a "claw" machine in the food court which offers a free play in exchange for a social network update promoting the mall. In response to the offer, the user makes a social network update via their mobile device to promote the mall. The "claw" machine then provides one play "credit" allowing the user to play and grab a toy. Similarly, a user in an airport may see a soda machine offering a free soda in exchange for sending a certain text message to a CSC number. The user sends a text message to a CSC number via their mobile device, which inherently provides their contact information. The soda machine then provides a credit with which the user can select a soda as a reward and airport receives the contact information from a known patron with which to build a mailing list for future marketing.

Figure 7:
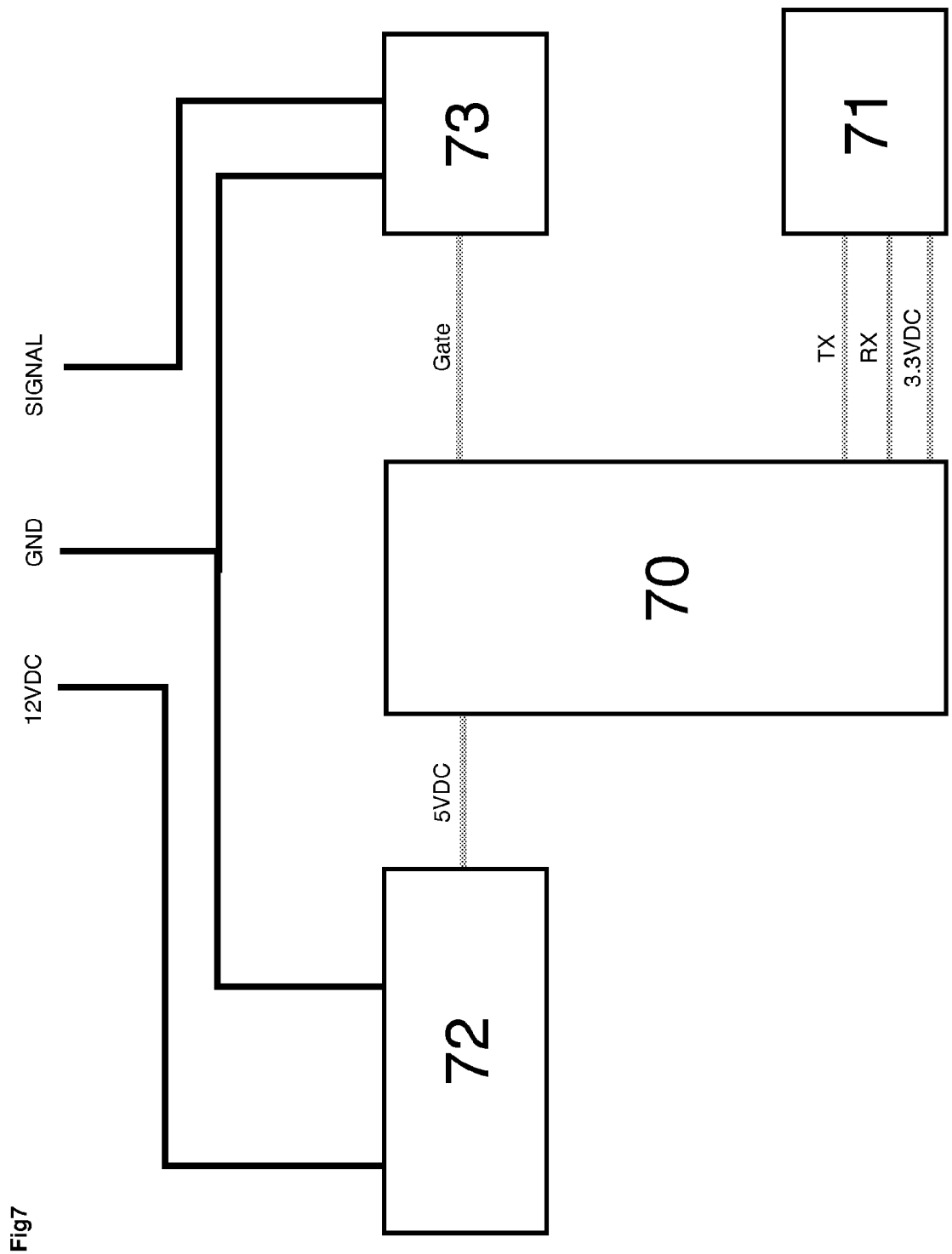
FIG. 7 shows the primary hardware components of the non-video version of a system built in accordance with the present invention.
Figure 8:
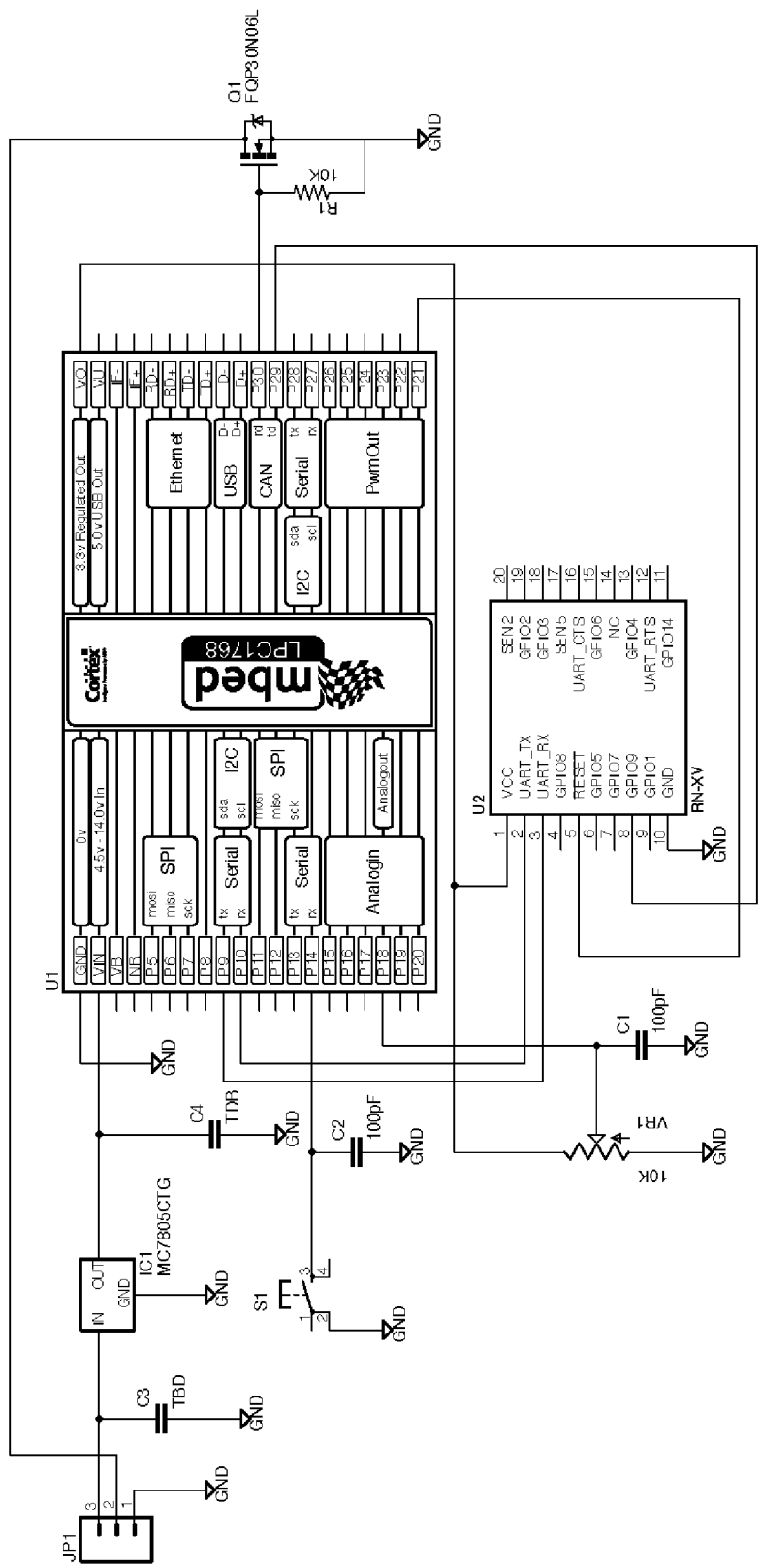
FIG. 8 shows the circuitry components of the non-video version of a system built in accordance with the present invention.

There are two versions of the interface of the redemption module 52 of a rewards distribution system built in accordance with a legacy embodiment of the present invention, a non-video version and a video version. Referring now to FIGS. 7 and 8, the hardware setup of the legacy embodiment of the non-video version includes uses a microcontroller 70 which connects to a Wi-Fi 71 module through a universal asynchronous receiver/transmitter, as well as to a linear regulator 72 and a negative-channel metal-oxide semiconductor ("NMOS") 73.

In a contemporary embodiment, the hardware setup of the redemption module 52 includes two microcontrollers; one that handles the machine protocol, whether pulse or multi-drop bus ("MDB"), and the second that handles communication with the server via a wireless communication protocol. In one embodiment, the wireless communication protocol is a cellular data protocol, such as GSM, but it is understood that conventional wireless (or wired) data protocols may be employed in communicating with the server. Power for the unit is provided via a switching regulator that permits an input range of 10-35 VDC. The machine interfaces available on each unit include MDB or other serial communication bus, Active Low Pulse, or Active High Pulse.

Figure 9:
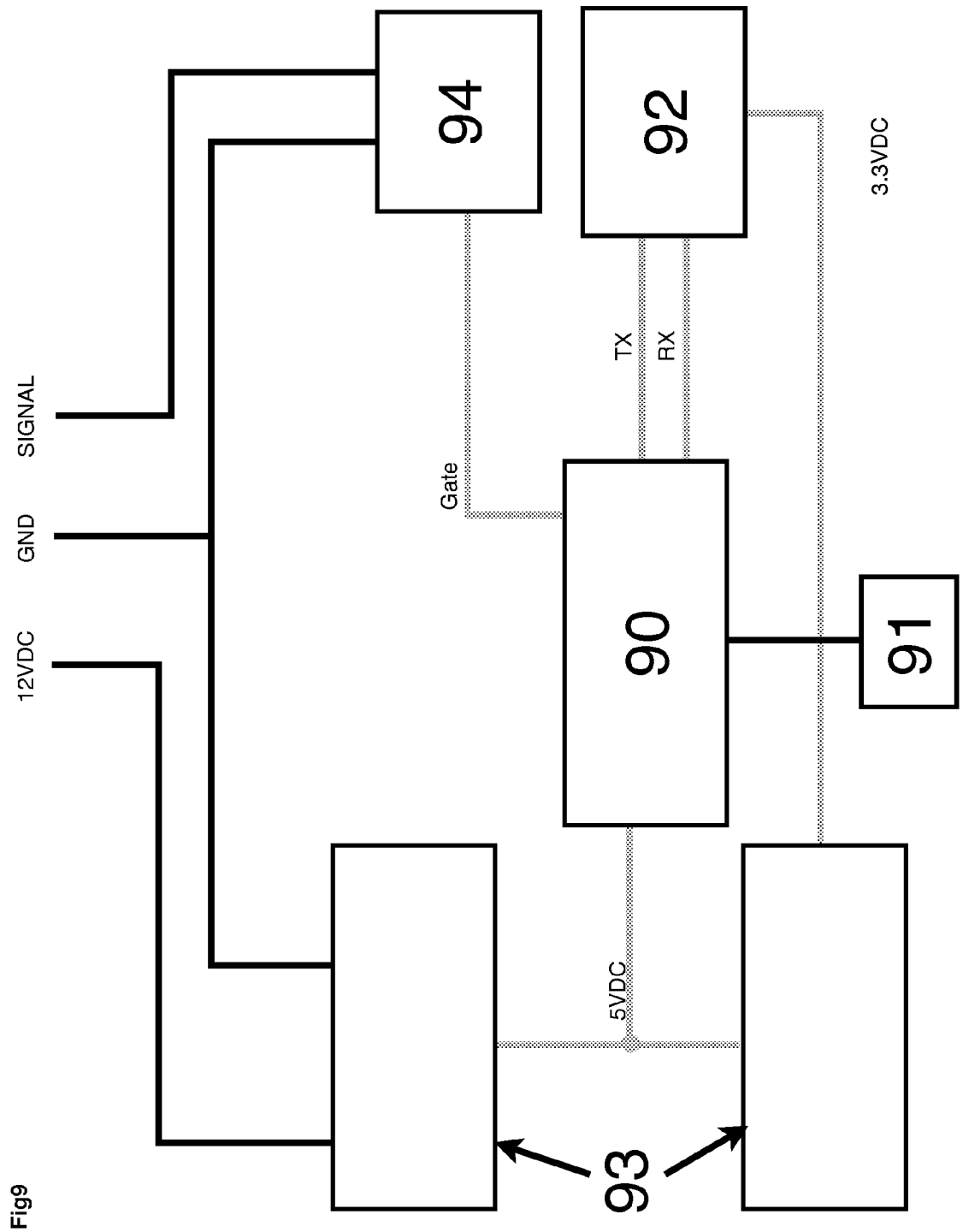
FIG. 9 shows the primary hardware components of the video version of a system built in accordance with the present invention.
Figure 10:
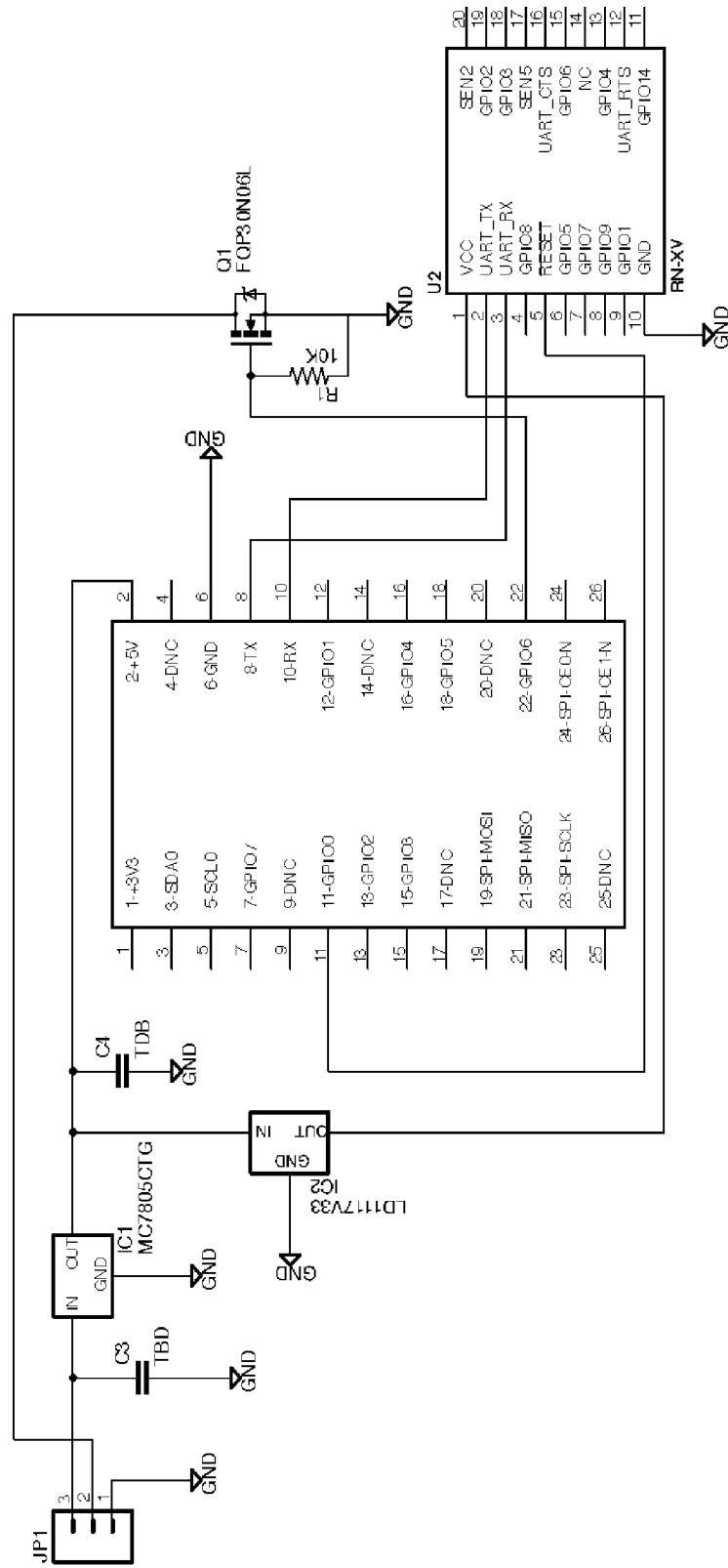
FIG. 10 shows the circuitry components of the video version of a system built in accordance with the present invention.

Referring now to FIGS. 9 and 10, the hardware setup of the legacy embodiment of the video version includes also includes a microcontroller 90 which additionally includes an HDMI port 91, with the microcontroller otherwise being configured in a similar manner as in the non-video version with the Wi-Fi 92 module through a universal asynchronous receiver/transmitter, as well as two linear regulators 93 and an NMOS 94.

The hardware setup for video version of the contemporary embodiment is similar to that of the legacy embodiment except that a single switching regulator is used in place of the two linear regulators 93 and that the Wi-Fi 92 module has been moved to a USB interface.

In the one embodiment, the redemption module 52 connects to the validation module 51 server via a web socket. To identify each distinct redemption module 52 which may be in operation at a given time, the validation module 51 utilizes a unique identifier. This unique identifier is defined as either the microcontroller serial number or the MAC address being used. It is contemplated however, that any unique identifier may be employed, including SIM Card ICCID for cellular based modules. In addition, for the video version of the redemption module 52, the web socket connection is used to pull any status update currently in use so as to display the status update on the video screen. The video version of the redemption module 52 is also configured to pull the handle/user identification information of a user who successfully redeems a credit so as to display the handle/user identification information on the video screen along with a predefined, credit issuance message. Messages to be displayed on one or more video versions of a redemption module 52 in use at a given time can also be uploaded to the server of the validation module 51 and subsequently pulled by target video version redemption modules 52 so as to be displayed on the video screen.

The dispensing machine interface of the redemption modules 52 built in accordance with the preferred embodiment of the present invention is essentially a tie in to an existing payment system. For example, in standard arcade/carnival games that use a single pulse system, the coin mechanisms have a power, ground and signal connection. When a coin is inserted, it is validated by the mechanism and if valid, the signal line is actuated. This actuation is typically accomplished by pulling the signal line to the ground. This is then repeated with each valid insertion until the preprogrammed number of payments per credit is reached. The dispensing machine interface of the redemption module 52 mimics this by driving the gate of a NMOS that is connected between the signal and the ground inputs. A pulldown resistor between the gate and source with a value of 10K is required to ensure credits are not issued when the redemption module 52's microcontroller GPIO is in an unknown state. It is contemplated that the pulse length for the redemption module 52's microcontroller is customizable and responsive to updates from the server of the validation module 51 to allow flexibility with different dispensing machines 53.

More complex vending machines use serial data to communicate between the main board and the payment devices. This is conventionally embodied as the MDB specification currently maintained by the National Automatic Merchandising Association. To interface with such devices on a microcontroller, the parity bit will need to be manually controlled on each packet of data from the server of the validation module 51. Accordingly, embodiments of the present invention configured to operate with the MDB specification include the required isolated connection point and ability to respond to cashless device commands and allows for the selection of primary or secondary cashless device via a switch on the unit.

Figure 11:
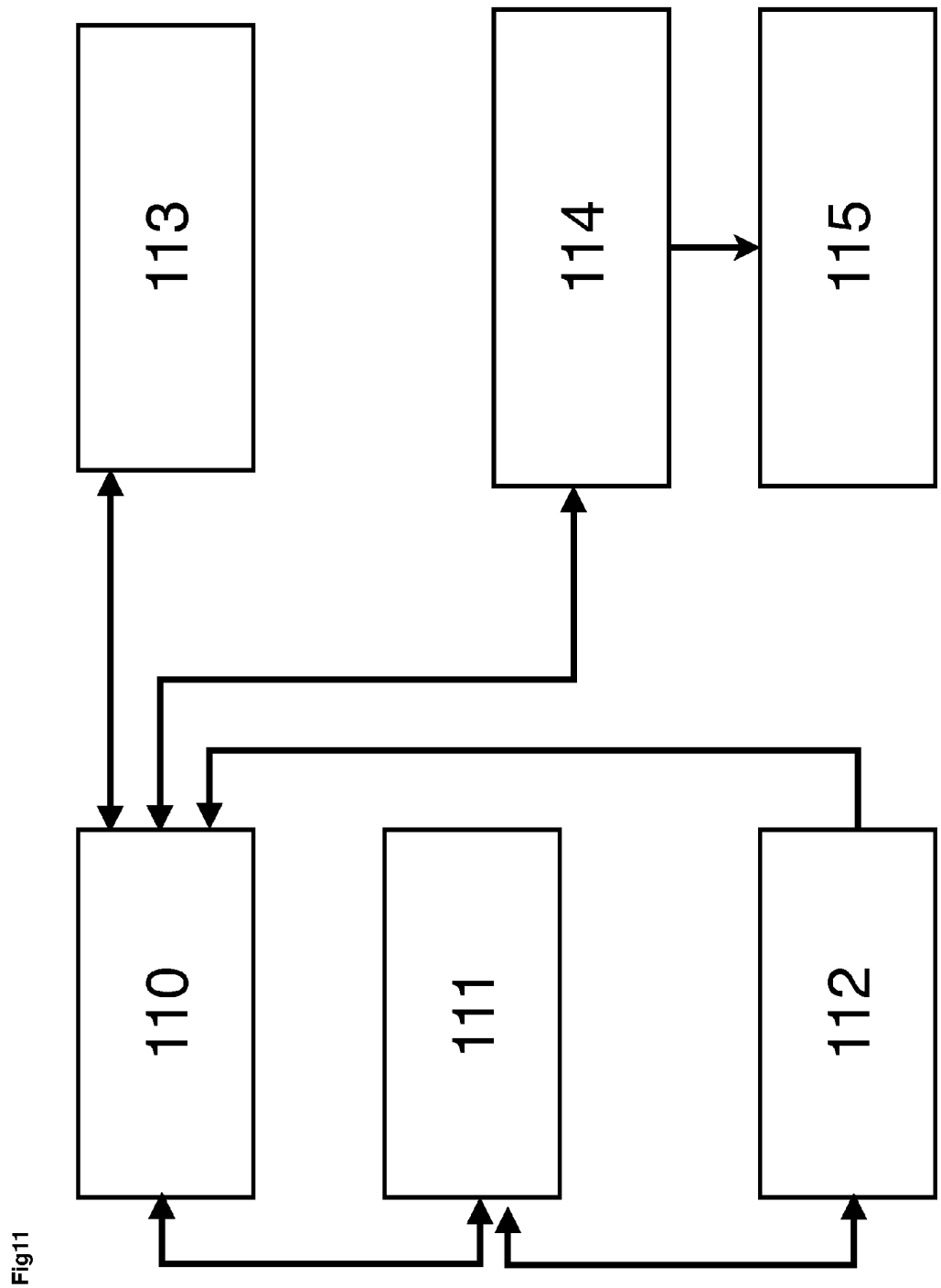
FIG. 11 is a block diagram of the primary software components and their interaction in a system built in accordance with the present invention.
Figure 12:
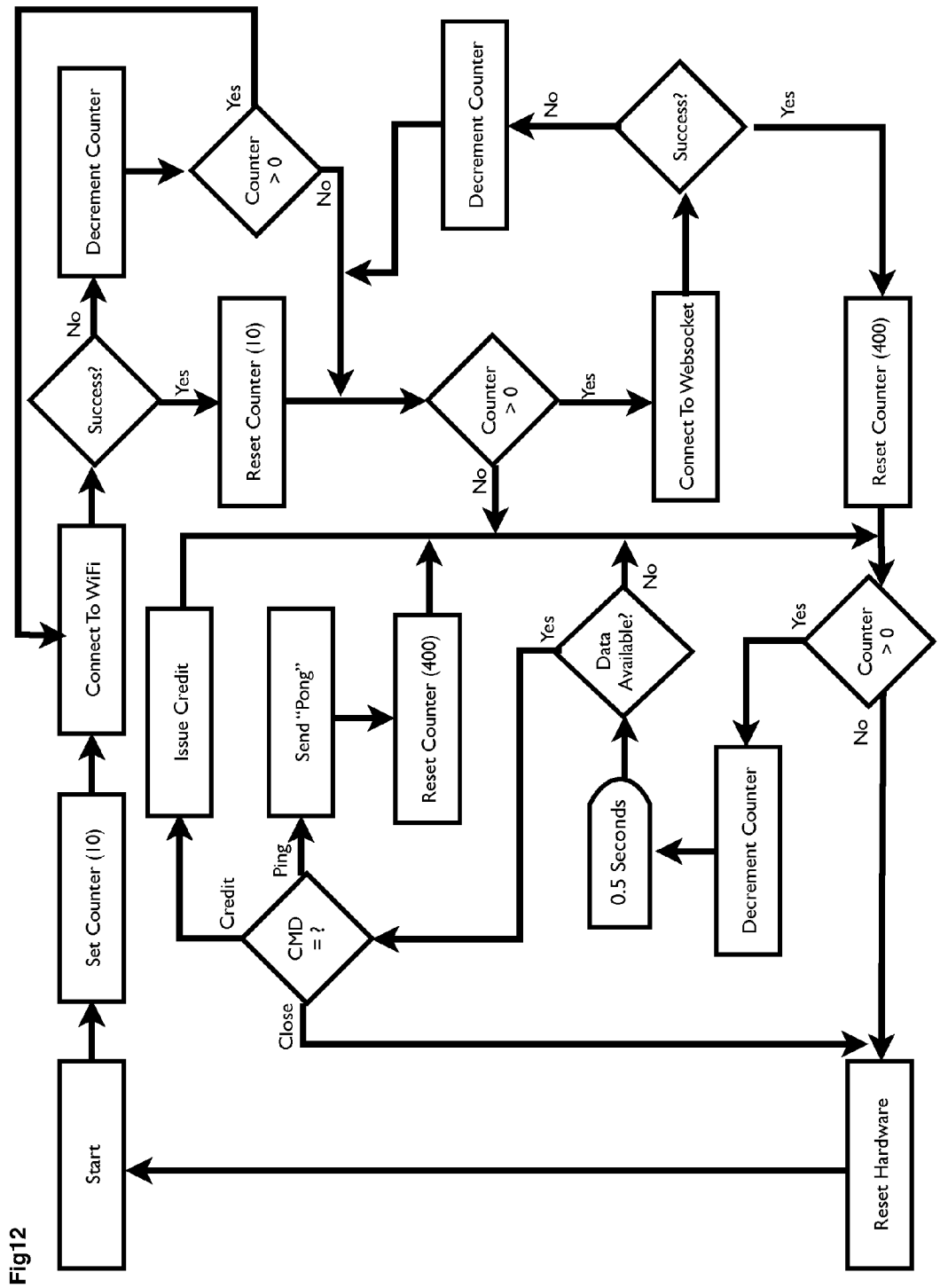
FIG. 12 is a flow chart of the software components are their operation in a system built in accordance with the present invention.

Referring now to FIGS. 11 and 12, the design and operation of the software which operates the rewards distribution system is detailed. In the preferred embodiment, there are three primary software components of the server side of the system, a python portion 110, a MySQL portion 111, and a PHP portion 112. The python portion is the heart of the system, as it handles the majority of the function of the system monitor 50 and validation module 51. It hosts the socket server and the connections to the social media streams 113. It also provides for communications with the redemption module 52 in its interface 114 with a dispensing machine 115. The MySQL portion 111 hosts the database so as to allow logging of all connections, pings, phrase updates, social media publications and credits issued. The PHP portion 112 hosts the administrator interface where machines having a redemption module 52 can be added and controlled.

As seen in FIG. 12, the steps of operation for the software on the redemption module 52 are defined by a use of counters to implement the desired logic It is contemplated that future expansion can be accounted for by an expansion header which all available I/O connections are brought to. In the preferred embodiment, a 26 pin header is used to allow for the same.

| | |
|---|---|
| Vin | P20/Analog In |
| GND | P19/Analog In |
| 5 V | P18/Analog In/Analog Out |
| GND | P17/Analog In |
| 3.3 V | P16/Analog In |
| GND | P15/Analog In |
| P14/RX | P27/RX/SCI |
| P13/TX | P28/TX/SDA |
| P5/MOSI | P29 |
| P6/MISO | P30 |
| P7/SCK | P26/PWM |
| P22/PWM | P25/PWM |
| P23/PWM | P24/PWM |

In an alternate embodiment, software for the rewards distribution system is embedded in one or more applications which allow access to a user's social media network accounts such that the user's activity on the affected social media network account is purposefully and directly availed to the system monitor for scanning.

Referring now to FIGS. 13a, 13b, and 14, the operative components of one embodiment of the system and method for remote transaction initiation 130 include a remote server 131, an initiating device, defined in the preferred embodiment as a mobile device 132, and a dispensing machine 133. In another embodiment, the initiating device is an initiating dispensing machine 134. It is additionally contemplated the initiating device may also be a computer. In this regard, the distinguishing element of the initiating device is that it initiates a request for the issuance of machine credit on a separate dispensing machine (this, in contrast to the conventional practice wherein machine credit on a dispensing machine is distributed in response to actions performed locally on the dispensing machine distributing the credit).

It is contemplated that a plurality of actions by a user could be performed to cause an initiating device to generate and transmit a remote credit request. For example, a user can perform some social media action on a mobile device 132, such as publishing a status update in response to signage offering a reward in exchange for a status update, with the social media action (as solicited by the signage) serving as the generated remote credit request. Similarly, a user may, on a mobile device 132 or a computer, initiate an m-commerce purchase, transact the purchase with the remote server, and have a remote credit request be generated. A remote credit request may also be generated in response to an invitation to provide feedback an experience at a particular location in exchange for machine credit, call a number, provide the requested feedback, and have a remote credit request generated by the an agent who received the feedback. Another way a remote credit request may be generated is by a user who, in response to signage offering a reward in exchange for has a friend perform some social media action on a mobile device 132 or computer. In addition, a remote credit request may be generated on behalf of a user when the user purchases a product at an initiating dispensing machine 134 that has been paired with another dispensing machine 133 such that whenever certain items are purchased at the initiation dispensing machine 134, a remote credit request for fulfillment at the dispensing machine 133 is automatically generated and transmitted. For example, a vending machine containing snacks may be dynamically paired with a vending machine containing soft drinks. In such an arrangement, users could be advised that if a certain brand of chips is purchased from the vending machine containing snacks, as the initiating dispensing machine 134, then the user would automatically receive a soft drink of a certain brand from the vending machine containing soft drinks, as the dispensing machine 133.

The method for remote transaction initiation begins with the generation of a remote credit request. As previously stated, the remote credit request may be embodied as a social media action, a prompt from a computer, or a prompt from an initiating dispensing machine 134. As such, generated remote credit requests are either embodied as actions performed on the Internet or as transmissions sent over the Internet. Either way, once generated, remote credit requests are captured by the remote server 131 to be validated. The remote server 131 then applies the relevant validation criteria to the remote credit request, such as a maximum proximity and length of time since last remote credit request or, if the remote credit request was generated from an m-commerce purchase, the approval of the transaction. Once the remote credit request has been validated under the applicable criteria, an issue credit command is transmitted to the target dispensing machine 133 and the dispensing machine 133 issues the machine credit.

In the preferred embodiment, the remote server 131 includes a database of dispensing machines 133 in which it communicated with and that could initiate transactions from remote credit requests. It is contemplated that each dispensing machine 133 would be assigned a unique identifier when it is entered into the database and brought online with the remote server 131. As part of such a database, the remote server 131 would also include location information for each of the dispensing machines 133 that it operated with. In an alternate embodiment, the remote server 131 additionally includes currency information for each of the dispensing machines 133 that it operated with.

The identity of the target dispensing machine 133 for a remote credit request is ascertained by the remote server 131 in one of three ways, user selection, location selection, and dynamic pairing. With user selection, the remote credit request generated by the user includes the unique identifier of the target dispensing machine 133 for the machine credit. Such may be provided by the user the use of a QR code, a text entry of the unique identifier, or a verbal entry of the unique identifier. With location selection, the user's remote credit request, which includes the user's location information, is embedded with a request to transmit the issue credit command to the nearest dispensing machine 133 based on the user's location information and the database location of the dispensing machines 133. The dynamic pairing location determination operates as expressed above.

In one embodiment, the transmittal of an issue credit command for user selection and location selection dispensing machine targeting may be accompanied by a transmission to the mobile device 132 or computer having a verification entry. In such an embodiment, the user would have to enter the verification entry on the dispensing machine 133 in order for the machine credit to be issued. It is understood that such would enhance the ability of the system and method for remote transaction initiation 130 to accurately distribute machine credits in crowded locations.

Figure 15:
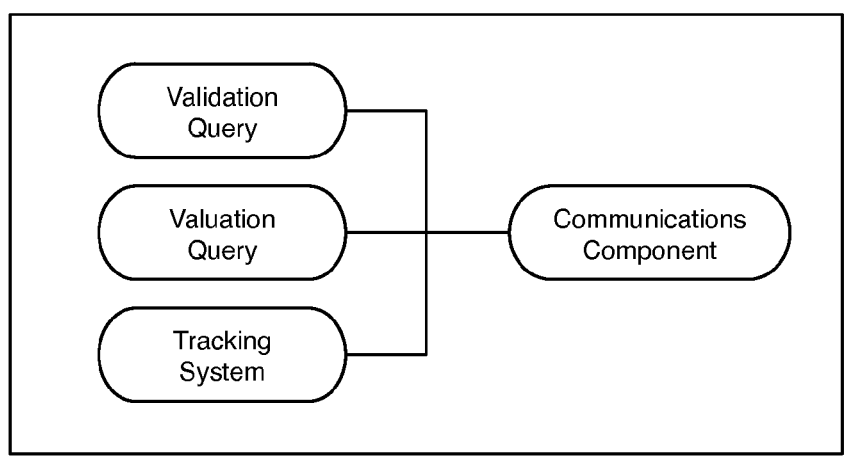
FIG. 15 is block diagram showing an embodiment of a validation module built in accordance with the present invention having a valuation component.

Referring now to FIG. 15, the validation module which includes a valuation query component operates in a similar manner to the validation module lacking the valuation query component, as shown in FIG. 3, but with the addition of a valuation query component. The valuation query component operates after the validation query component has confirmed eligibility for a reward/credit, and a varying reward level is assigned in real time to a particular user's social media action through the valuation query component depending on the social media profile of that user. The reward level standardizes the reward amount to be credited from measurements of social activity on different platforms. The reward level also allows particular merchants to customize how it weighs a user's social media influence and activity in accordance with its marketing philosophy or decisions.

In the preferred embodiment, a merchant may elect to have the reward level calculated as the product of a user's social media influence and a scaling factor, creating a reward percentage, and multiplying the reward percentage by the max reward value available. A merchant may in the alternative elect to have the reward level calculated as above, but additionally multiply an activity factor so as to reward users who are more active in social media channels.

A user's social media influence may be defined as a summation of a user's social media connectivity, such as a number of friends the user has on Facebook®, number of followers the user has on Twitter®, number of connections in LinkedIn® (or similar personal connection totals from social networking services such as Instagram®, Google+, etc.) or be from third party measurements of influence, such as a score or Klout® or PeerIndex™. The scaling factor employed is a fractional number which scales a quantification of friends or follows with score calculations such that the product of the scaling factor and social media influence is a percentage. The activity value is a scaling value which quantifies a user's activity level on social media networks. In the alternative, the activity value may be used to devalue the reward level of a user for repeated redemptions of the same reward (in addition to the minimum time span between redemptions limitation).

Figure 16:
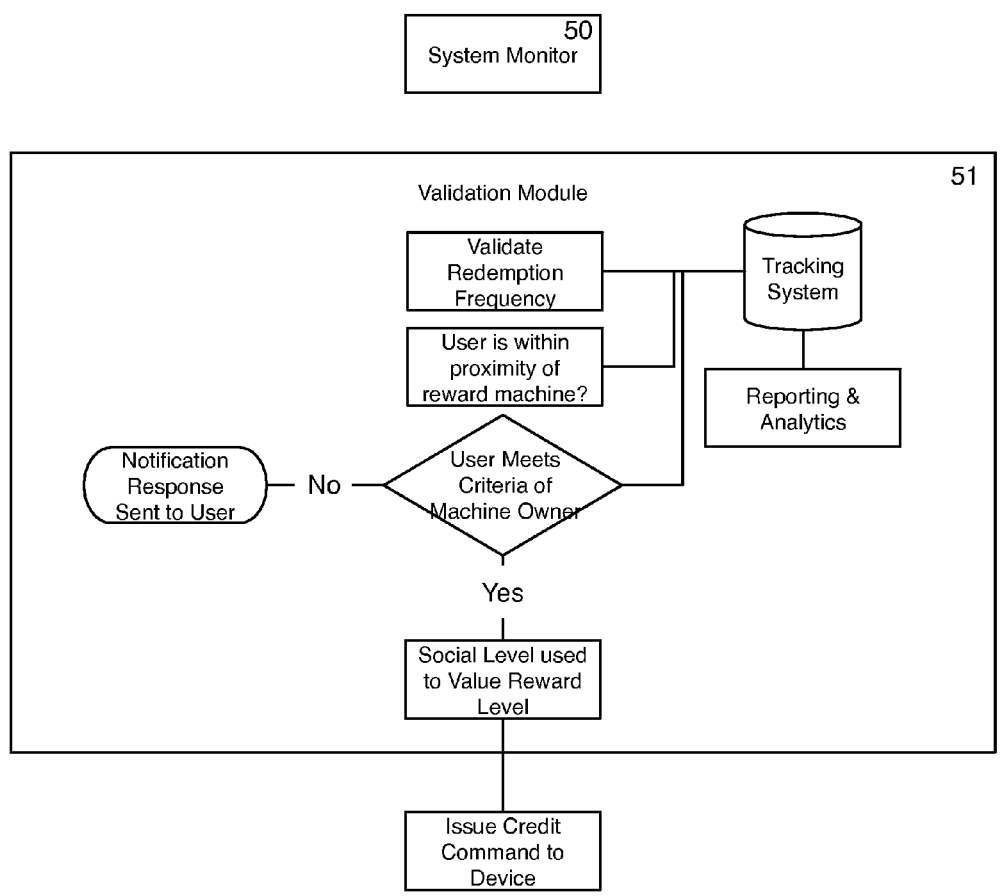
FIG. 16 is a block diagram showing the validation component of the rewards distribution system with valuation built in accordance with the present invention lacking a valuation component query.

Referring now to FIGS. 15, 16, and 17, once the validation module 51 has completed the validation query and the eligibility of a user attempting to receive a reward credit on a dispensing machine is validated, a valuation query performs a valuation routine, which is customized based on how a participating merchant decides to account for the social level of a user or patron transmitting a match phrase (or performing a qualifying social media action) and seeking to redeem a reward. Through the valuation query, a reward level is calculated in embodiments employing dynamic valuing of user social action based on social media influence. To assign a dynamic value to a particular user's social media action and award a user with a reward level based on that user's social media influence, first a value for the user's social media influence is ascertained. The user's social media influence value may be provided by the social media portal which is used to push the status update being rewarded, or may be obtained by the system monitor 50 when a match phrase is detected on a social media network from the public profile information of the user publishing the relevant social update. In this regard, the number of friends or followers of a user may be provided or obtained, or a third party measurements of influence may be provided or obtained.

Once a value for the user's social media influence is ascertained, the validation module 51 calculates a reward level using the formula selected by the merchant who operates the dispensing machine on which the reward will be provided. It is contemplated that the reward level will represent some amount, up to 100%, of the item sought by the user transmitting the social media update based on that particular user's social media profile. In this regard, a merchant can award greater value to the social actions of users whose social media actions that merchant believes will be of greater value to its business.

In an alternate embodiment, the reward level may be calculated based on a system of tiering, with a user having less than 100 friends/followers or less than a 10 influence score earning a first value, a user having 101-250 friends followers or between 11 and 25 influence score earning a second, higher value, and a user having 251+ friends followers or greater than 26 influence score earning a third, highest value.

In another alternative embodiment, the reward level may be calculated as a set amount per friend/follower or influence score, such as a $0.001 value per friend.

In yet another embodiment, the reward level would award rewards in the form of an item based on the user's influence score. For example, either an item may be awarded for each point of influence score or a percentage point toward an item may be awarded for each point of influence score.

The tracking system logs the reward level awarded with the user information, location information, date/time information, social influence information, and other desirable information. This information is kept for reporting and analytic purposes.

The instant invention has been shown and described herein in what is considered to be the most practical and preferred embodiments. It is recognized, however, that variations and departures may be made therefrom within the scope of the inventions and that obvious modifications will occur to a person of ordinary skill in the art.

What is claimed is:

1. A system for assigning a value to an electronic communications action, comprising:
    a computer system having one or more processor units and non-transitory computer-readable medium in communication with the one or more processor unit, said medium having one or more computer programs stored thereon including a set of instructions that, when executed by one or more processor units, cause the one or more processor units to perform the steps of monitoring at least one electronic communication network for at least one predetermined electronic transmission and validating at least one of the detected electronic transmissions;
    one or more vending or gaming machine, each coupled with the computer system and adapted to issue a machine credit representing one of a plurality of value amounts in response to a electronic command from the computer system;
    wherein the step of monitoring includes detecting electronic transmission performed by a remote electronic device on the at least one network and said at least one predetermined electronic transmissions are embodied as a qualifying social action, defined by a published electronic message containing one or more preset match phrases;
    wherein each qualifying social action has been associated with at least one of the one or more vending or gaming machines;
    wherein the step of validating includes at least associating the electronic transmission with a unique user account, assigning a value amount to the electronic transmission which relates to a social media influence measurement of the associated user account, and identifying at least one of the one or more vending or gaming machines which has been associated with the detected qualifying social action; and
    wherein said one or more processor units are configured to additionally perform the step of commanding the at least one of the one or more vending or gaming machines identified in the step of validating to issue machine credit representing the assigned value amount and the steps of monitoring and validating are performed in a location distinct from the one or more vending or gaming machines.

2. The system of claim 1, wherein:
wherein said computer system is configured to additionally execute the step of providing a social action portal through which a social update can be performed; and
a qualifying social action additionally includes performing a social update through at least one social action portal and the step of monitoring includes receiving notification of the social update performance from the social action portal used to perform the social update.

3. The system of claim 1, wherein a qualifying social action additionally includes transmission of an electronic message through a direct message delivery service and the step of monitoring includes receipt of an electronic message to a Common Short Code number.

4. The system of claim 1, wherein:
qualifying social actions are required to contain electronically embedded location information sufficient to ascertain the physical location of the user account that generated the qualifying social action; and
the step of validating additionally includes confirming the physical location of the user account that transmitted the electronic message being validated relative to at least one vending or gaming machine associated with the qualifying social action.

5. The system of claim 1, wherein identifying information pertaining to the user account that transmitted any qualifying social action, including the specific device used to perform the qualifying social action, is tracked by the computer system.

6. The system of claim 1, wherein the step of validating additionally includes inquiring into previous qualifying social actions transmitted by the user account that transmitted the qualifying social action being validated and a valuation query operates to assign a value amount.

7. The system of claim 1, wherein the computer system additionally includes at least one electronic visual user interface at the physical location of at least one of the one or more vending or gaming machines.

8. The system of claim 1, wherein qualifying social actions on the monitored communication network are required to contain metadata tags to be verified.

9. A method for assigning a value to an electronic communications action, comprising the steps of:
providing a computer system connected to at least one electronic communication network and having one or more processor units and non-transitory computer-readable medium in communication with the one or more processor unit, wherein said medium having one or more computer programs stored thereon which include a set of instructions executable by one or more processor units;
coupling one or more vending or gaming machine with the computer system so as to adapt the one or more vending or gaming machine to issue a machine credit representing one of a plurality of value amounts in response to a electronic command from the computer system;
monitoring by said one or more processor units said communication network for at least one predetermined electronic transmission, wherein the step of monitoring includes detecting electronic transmissions performed by a remote electronic device on the at least one network and said at least one predetermined electronic transmissions is embodied as a qualifying social action, defined by a published electronic message containing one or more preset match phrases;
associating by said one or more processor units each qualifying social action with at least one of the one or more vending or gaming machines;
validating by said one or more processor units any electronic transmissions detected, wherein the step of validating includes at least associating the electronic transmission with a unique user account, assigning a value amount to the electronic transmission which relates to a social media influence measurement of the associated user account, and identifying at least one of the one or more vending or gaming machines which has been associated with the detected qualifying social action;
wherein the steps of monitoring and validating are performed in a location distinct from the one or more vending or gaming machines; and
commanding by said one or more processor units the at least one of the one or more vending or gaming machines identified in the step of validating to issue machine credit of said assigned value amount.

10. The method of claim 9, additionally including the step of providing a social action portal through which a social update can be performed, wherein the qualifying social actions are additionally defined by the performance of a social update through at least one social action portal and the step of monitoring includes receiving notification of the social update performance from the social action portal used to perform the social update.

11. The method of claim 9, wherein the qualifying social actions are additionally defined by a transmission of an electronic message through a direct message delivery service and the step of monitoring includes receipt of an electronic message to a Common Short Code number.

12. The method of claim 9, wherein:
qualifying social actions are required to contain electronically embedded location information sufficient to ascertain the physical location of the user account that generated the qualifying social action; and
the step of validating additionally includes confirming the physical location of the user account that transmitted the electronic message being validated relative to at least one of the one or more vending or gaming machines associated with the qualifying social action.

13. The method of claim 9, wherein identifying information pertaining to the user account that transmitted any qualifying social action, including the specific device used to perform the qualifying social action, is tracked by the computer system.

14. The method of claim 9, wherein the step of validating additionally includes inquiring into previous qualifying social actions transmitted by the user account that transmitted the qualifying social action being validated and a valuation query operates to assign a value amount.

15. The method of claim 9, wherein the computer system additionally includes at least one electronic visual user interface at the physical location of at least one of the one or more vending or gaming machines.

16. The method of claim 9, wherein qualifying social actions on the monitored communication network are required to contain metadata tags to be verified.

17. A method for assigning a value to an electronic communications action, comprising the steps of:
providing a computer system connected to at least one electronic communication network and having one or more processor units and non-transitory computer-readable medium in communication with the one or more processor unit, wherein said medium having one or more computer programs stored thereon which include a set of instructions executable by one or more processor units;

coupling one or more vending or gaming machine with the computer system so as to adapt the one or more vending or gaming machine to issue a machine credit representing one of a plurality of value amounts in response to a electronic command from the computer system;

monitoring by said one or more processor units said communication network for at least one predetermined electronic transmission, wherein the step of monitoring includes detecting electronic transmissions performed by a remote electronic device on the at least one network and said at least one predetermined electronic transmissions is embodied as a qualifying social action, defined by a published electronic message containing one or more preset match phrases;

associating by said one or more processor units each qualifying social action with at least one of the one or more vending or gaming machines;

validating by said one or more processor units any electronic transmissions detected, wherein the step of validating includes at least associating the electronic transmission with a unique user account, assigning a value amount to the electronic transmission which relates to a social media influence measurement of the associated user account, and identifying at least one of the one or more vending or gaming machines which has been associated with the detected qualifying social action;

wherein qualifying social actions are required to contain electronically embedded location information sufficient to ascertain the physical location of the user account that generated the qualifying social action and the step of validating additionally includes confirming the physical location of the user account that transmitted the electronic message being validated relative to at least one of the one or more vending or gaming machines associated with the qualifying social action; and commanding by said one or more processor units the at least one of the one or more vending or gaming machines identified in the step of validating to issue machine credit of said assigned value amount.

18. The method of claim 17, additionally including the step of providing a social action portal through which a social update can be performed, wherein the qualifying social actions are additionally defined by the performance of a social update through at least one social action portal and the step of monitoring includes receiving notification of the social update performance from the social action portal used to perform the social update.

19. The method of claim 17, wherein the steps of monitoring and validating are performed in a location distinct from the one or more vending or gaming machines.

20. The method of claim 17, wherein the step of validating additionally includes inquiring into previous qualifying social actions transmitted by the user account that transmitted the qualifying social action being validated and a valuation query operates to assign a value amount.

* * * * *